United States Patent [19]

Ito et al.

[11] Patent Number: 5,359,909
[45] Date of Patent: Nov. 1, 1994

[54] CONTROL CABLE ADJUSTING ARRANGEMENT

[75] Inventors: Yasuhiko Ito, Zama; Makoto Shiota, Osaka; Hiroshi Yokote, Ina; Takumi Watanabe, Yokohama; Norio Togano, Kosai, all of Japan

[73] Assignees: Nissan Motor Co., Ltd.; Nippon Cable System Inc.; Uni Flex Co., Ltd.; Ohi Seisakusho Co., Ltd.; Fuji Kiko Co. Ltd., Japan

[21] Appl. No.: 5,358

[22] Filed: Jan. 19, 1993

[30] Foreign Application Priority Data

Jan. 21, 1992 [JP] Japan .................................. 4-008419

[51] Int. Cl.⁵ .............................................. F16C 1/10
[52] U.S. Cl. .................. 74/502.6; 74/502.4; 74/500.5; 74/502
[58] Field of Search .............. 74/500.5, 501.5 R, 502, 74/502.4, 502.6

[56] References Cited

U.S. PATENT DOCUMENTS

| | | | |
|---|---|---|---|
| 4,903,541 | 2/1990 | Shiota | 74/500.5 X |
| 5,002,315 | 3/1991 | Bartholomew | 74/502.6 X |
| 5,003,838 | 4/1991 | Pospisil et al. | 74/502.6 X |
| 5,015,023 | 5/1991 | Hall | 74/502.6 X |
| 5,199,320 | 4/1993 | Spease et al. | 74/502.4 |
| 5,265,493 | 11/1993 | Solano et al. | 74/501.5 R |
| 5,272,934 | 12/1993 | Chegash et al. | 74/502.4 |

FOREIGN PATENT DOCUMENTS

| | | | |
|---|---|---|---|
| 0397612 | 11/1990 | European Pat. Off. | 74/502.6 |
| 0508625 | 10/1992 | European Pat. Off. | 74/502.6 |
| 0517583 | 12/1992 | European Pat. Off. | 74/502.6 |
| 61-131513 | 8/1986 | Japan . | |
| 1-131014 | 9/1989 | Japan . | |
| 4-29609 | 1/1992 | Japan | 74/502.6 |

OTHER PUBLICATIONS

Mitsubishi "Lancer" Complete Equipment Manual—Transmission Control, '88-6.
Mitsubishi "GTO" Complete Equipment Manual-'90-10.

*Primary Examiner*—Vinh T. Luong
*Attorney, Agent, or Firm*—Lowe, Price, LeBlanc & Becker

[57] ABSTRACT

A control cable adjusting arrangement for a gear shift locking arrangement includes a holder portion which accepts an inner cable of a control cable in one end thereof. An outer cable encasing the inner cable is retained by a bracket. The other end of the holder accepts an end of a control rod associated with a gear shift lever. Disposed around the holder is a slider portion movable between a locked and unlocked position determined between two stopper flanges formed on the outer circumference of the holder. The holder and slider are made of an elastic material such as rubber and an end of the holder which accepts the end of the control rod has a flared outer circumference. When the slider is moved from the unlocked position to the locked position the end of the control rod becomes held firmly in the holder and the end of the inner cable held by the holder is drawn tightly such that slack is removed from the inner cable and the relative positions of the inner cable and the control rod may be adjusted by a simple one touch operation.

8 Claims, 2 Drawing Sheets

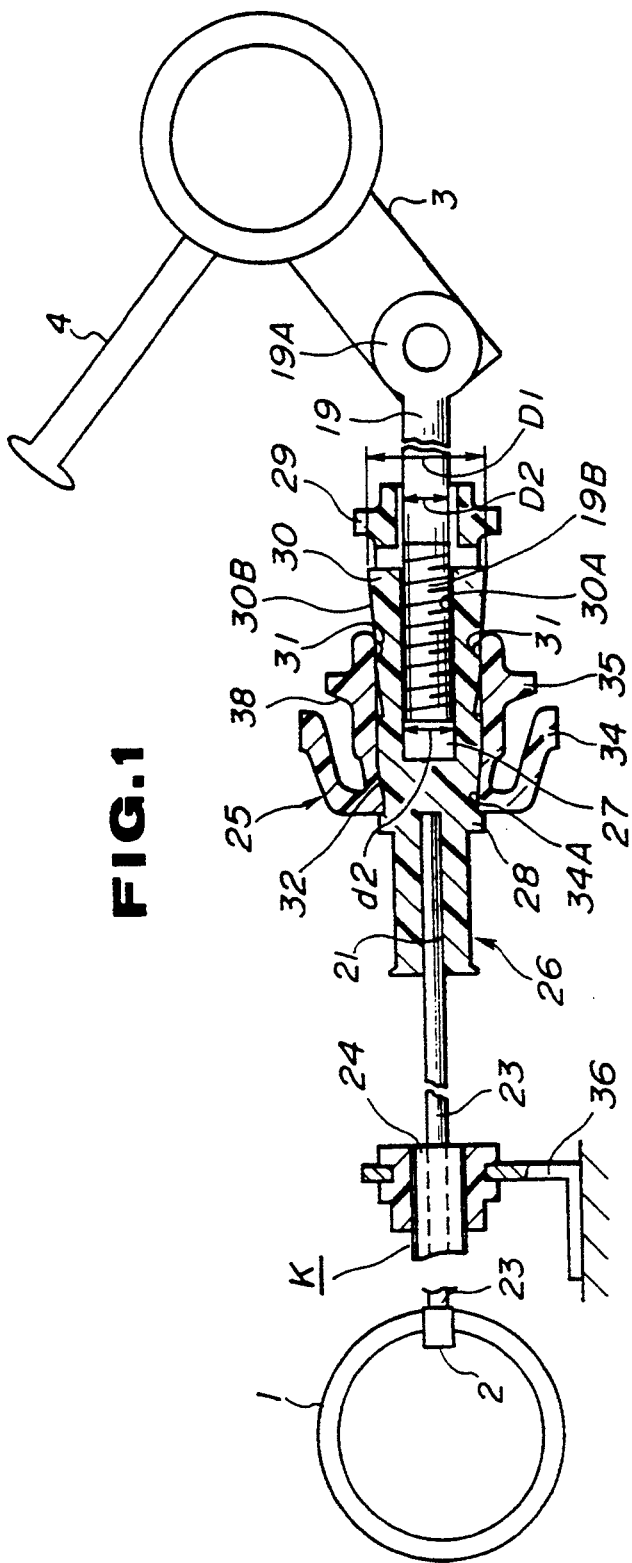
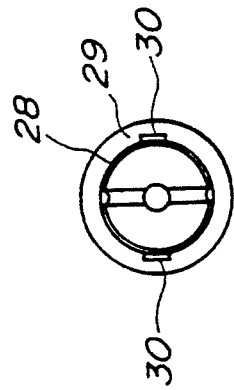
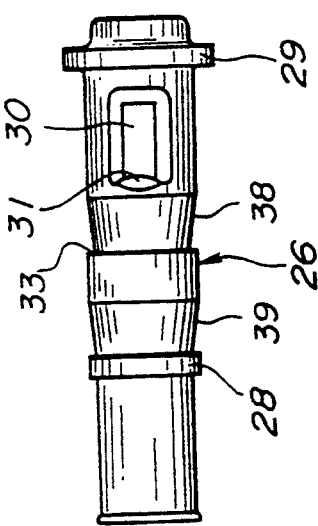
FIG. 1
FIG. 3
FIG. 2

CONTROL CABLE ADJUSTING ARRANGEMENT

BACKGROUND OF THE INVENTION

1. Field of the Invention

The present invention relates generally to an arrangement for securing a control cable for an automotive shift lever. Particularly, the present invention relates to an adjustable control cable retaining device.

2. Description of the Prior Art

A control cable is utilized in gear shifting arrangements for connecting between a gear shift lever and an ignition cylinder. Typically the control cable consists of an outer cable connected between the ignition cylinder and a cable adjustment portion of the gear shift apparatus and an inner cable connected from the shift lever through the cable adjustment portion and into the outer cable. One such conventional control cable arrangement is disclosed in Mitsubishi Lancer Complete Equipment Manual, pp. 23-24 and pp. 35.

In such a control cable arrangement, when the shift lever is in P (parking) position and the engine is OFF, the shift lever is locked such that it cannot be moved to another position. Thus, the shift lever must always be in P position for engine start operation. This safety feature is widely used in automotive vehicles equipped with automatic transmissions. When the ignition key is turned in the ignition cylinder, the control cable is pulled and locking of the shift lever is released. If loosening or stretching of the cable occurs, adjustment of the cable tension becomes necessary. Typically, the outer cable has a threaded collar portion inserted through a bracket which may be moved by turning nuts or the like which secure the collar portion for effecting adjustment of cable tension. Tightening of such nuts for effecting control cable tension adjustment is troublesome and time consuming. Further, after repeated adjustment of such nuts, they become worn and it becomes increasingly difficult to apply torque for adjusting the control cable tension. Also, adjustment of the control cable tension is carried out by applying adjustment to the outer cable, making it very difficult to compensate for slack, etc. in the inner cable which passes within the outer cable.

SUMMARY OF THE INVENTION

It is therefore a principal object of the present invention to overcome the drawbacks of the prior art.

It is a further object of the present invention to provide a one touch control cable adjustment arrangement which prevents occurrence of slack between the outer cable and the inner cable.

In order to accomplish the aforementioned and other objects, a control cable adjustment arrangement is provided, comprising: a holder portion being substantially cylindrical in shape and having receiving openings provided in opposite ends thereof, the holder portion including a first stopper flange projecting around an outer circumference thereof at one end, an adjusting portion integrally formed with the holder portion at the one end immediately behind the first stopper flange, a circumference of the adjusting portion being flared so as to become larger adjacent the first stopper flange, a tapered section extending from a base of the adjusting portion toward the other end of the holder and terminating at an engaging portion having a circumference larger than the taper, a second tapered portion formed spaced from the engaging portion in the direction of the other end, the second tapered portion terminating at a second stopper flange formed in the outer circumference of the holder and, a cable securing portion extending from the stopper flange to the other end, a first receiving opening the one end being of larger diameter and receiving a first member of larger diameter than a second receiving opening at the other end, the second receiving opening being of smaller diameter and receiving a second member of smaller diameter than the first member; and a slider being substantially ring shaped and being disposed concentrically around the holder portion between the first and second stopper flanges, an inner circumference of the slider being smaller than the flared end of the adjusting portion, an inner circumference of the slider including tapered locking surfaces operatively associated with at least a pair of arm portions extending from the slider at opposite sides thereof and curving toward the one end of the holder such that applying pressure to the arm portions will widen a distance between the tapered locking surfaces, when pressure is released from the arm portions at a first position of the slider, the tapered locking portions being engageable with a base of the second tapered portion adjacent the second stopper flange and, when pressure is released from the arm portion at a second position of the slider the tapered locking surfaces being engagable with the engaging portion of the holder.

BRIEF DESCRIPTION OF THE DRAWINGS

In the drawings:

FIG. 1 is an enlarged cross-sectional view of the control cable adjustment arrangement of the invention;

FIG. 2 is a plane view of a holder portion of the control cable adjustment arrangement of FIG. 1;

FIG. 3 shows a front view of a holder portion of the control cable adjustment arrangement of the invention;

DESCRIPTION OF THE PREFERRED EMBODIMENT

Figure 4:
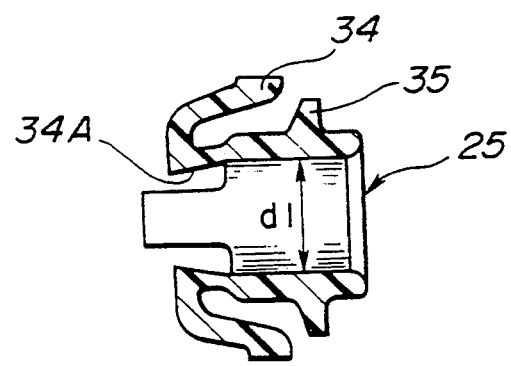
FIG. 4 shows a cross-sectional view of a slider portion of the control cable adjustment arrangement of the invention taken along line A—A of FIG. 5.

Referring now to the drawings, particularly to FIG. 1, as may be seen an outer cable 24 terminates at a bracket 36 to be securely held by the bracket 36. An inner cable or second member 23, which extends through the outer cable 24 to connect at one end with a stopper portion 2 in an ignition cylinder 1 of an automotive vehicle, for example, has another end projecting from the end of the outer cable 24 to be retained by a first receiving opening 21 in a holder 26 which interconnects the inner cable 23 and a rod or first member 19 connected to a movable plate 3 associated with a shift lever 4. Collectively, the outer cable 24 and the inner cable 23 will be referred to as the control cable K. Another end of the holder 26 receives a threaded end portion 19B of the rod 19 in a second receiving opening 27 formed in the holder 26. A circular slider 25 is arranged around the holder 26, movement of the slider 25 is limited by a first stopper flange 29 and a second stopper flange 28 formed at opposite ends of the holder 26.

Referring to FIGS. 1, 2 and 3, just before the stopper flange 29, an adjusting portion 30 is formed. The adjusting portion 30 has an inner wall 30A which is formed commonly with the first receiving opening 27 of the holder 26 and receives the threaded end portion 19B of the rod 19. As seen in FIGS. 1 and 2, the outer wall 30B of the adjusting portion 30 is formed commonly with the outer wall of the holder 26 at an end opposite that which secures the inner cable 23. The outer walls 30B of the adjusting portion 30 are flared outwardly at two points on the outer surface of the adjusting portion 30 so as to project from the circumferential surface of the holder 26. At the base of the adjusting portion 30 a first tapered section 38 ending at an engaging portion 33 is formed. Adjacent the second stopper flange 28, an end portion 32 of the slider 25 is formed. In an unlocked condition of the control cable K adjusting arrangement the end portion 32 is adjacent the stopper flange 28, in a locked condition of the control cable K adjusting arrangement, the end portion 32 is moved forward toward the engaging portion 33 on the adjusting portion 30. Thus, sliding movement of the slider 25 is possible between the stopper flange 28 and the engaging portion 33 over a second tapered section 39 at the holder 26. The holder 26 and slider 25 may be constructed of rubber, synthetic resin or other suitably flexible material.

Figure 5:
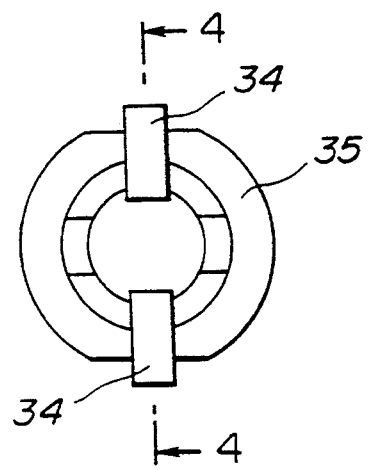
FIG. 5 is a front view of the slider portion.

Referring to FIGS. 4 and 5, tapered locking portions or surfaces 34A are present at the base of stopper arms 34 formed at opposite sides of the slider 25, extending therefrom and projecting forward in the direction of the rod 19. Pressing the stopper arms 34 inwardly causes the tapered locking surfaces 34A to separate from the outer surface of the holder 26 and the slider 25 may slide in the direction of the engaging portion 33, when the slider 25 has been moved, releasing the stopper arms 34 causes the locking surfaces 34A to firmly engage the engaging portion 33 of the adjusting portion 30 of the holder (see FIG. 6). Also, reversing the above operation allows the slider 25 to slide back to the original position.

Figure 6:
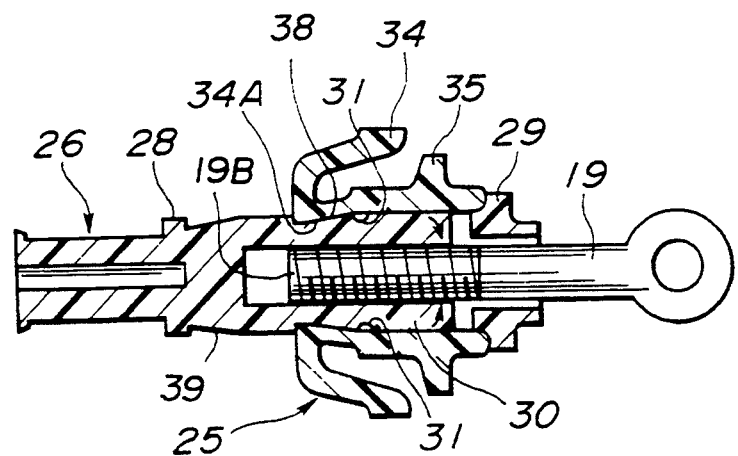
FIG. 6 shows the control cable adjustment arrangement of FIG. 1 in a locked state.

Further a flange portion 35 is formed on the outer circumference of the slider 25 so as to be adjacent the rod 19 in a locked position of the arrangement, as seen in FIG. 6.

The dimensions of the components of a control cable K adjustment arrangement according to the present embodiment are determined such that an inner diameter of the slider 25 is d1 (see FIGS. 4 and 5) an inner diameter of the opening 27 for receiving the threaded end of the rod 19 is d2 (FIG. 1), the diameter of the outer wall 30B is D1 and the diameter of the rod 19 is D2. The diameters are determined such that $D1 > d1 > d2 > D2$.

Hereinbelow, operation of the control cable adjusting arrangement according to the embodiment will be described in detail.

First, the end of the inner cable 23 is inserted into one end of the holder 26 and a threaded end portion 19B of the rod 19 is inserted into the opening 27 at the other end of the holder 26. At this time the slider 25 is in an unlocked position wherein the slider 25 engaging end portion 32 is adjacent the stopper flange 28 the tapered locking surface 34A tightly engages the outer circumference of the holder 26.

Then, while pressing the stopper arms 34 of the slider 25, the slider 25 is moved on the holder 26 in the direction of the rod 19. At first the threaded end portion 19B of the rod 19 may easily enter the opening 27 of the holder 26, then the slider 25 will encounter the flared outer wall 30B of the adjusting portion 30 and movement of the slider 25 will encounter resistance. Continued pulling of the slider 25 in the direction of the rod 19 will then pull the holder 26 and thus the inner cable 23 in the direction of the rod 19 thus tightening the inner cable 23 and removing any slack etc., therefrom. When the end portion 32 reaches the engaging portion 33 of the adjusting portion 30, the stopper arms 34 are released and the arrangement is locked, as seen in FIG. 6. Thus adjustment of the inner cable 23 relative the rod 19 may be carried out in a single one touch operation.

Further, referring to FIG. 6, when the slider 25 is moved in the direction of the stopper flange 29, an elastic portion 31 is formed in the outer side of the adjusting portion 30 to allow easy engagement of a tip portion of the threaded end 19B of the rod 19 while allowing sliding of the slider 25 in the direction of the rod 19.

Thus according to the invention simple one touch adjustment is available for the rod 19 and the inner cable 23 allowing slack to be removed from the inner cable 23 while the outer cable 24 is held stationary.

Thus, when such arrangement is used for connecting a gear shift lever to an ignition cylinder, for example, such that a hooked end 19A of the rod 19 is associated with a gear shift lever when the lever is drawn back, pulling the holder 26 and thus drawing the inner cable 23 in the direction of movement of the rod 19. A stopper portion set in an ignition cylinder for locking the ignition cylinder may be smoothly drawn back to allow operation of the vehicle. Conversely, when the gear shift lever is moved forward so as to push the rod 19 in the direction of the bracket 36, since no slack is present in the inner cable 23, the inner cable 23 is pushed smoothly into the outer cable 24 to surely and smoothly move a stopper, or the like, associated with the ignition cylinder for effecting locking of the cylinder. Thus the arrangement of the invention enhances the operation of a gear shift lever locking arrangement.

Further, although the present embodiment is disclosed in terms of adjusting a control cable K of a gear shift locking system, the arrangement of the invention may also be employed in any system requiring smooth reliable adjustment of a control cable for various application.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

We claim:

1. A control member adjustment arrangement, comprising:
 a holder portion being substantially cylindrical in shape, wherein said holder portion includes:
 (i) a first stopper flange projecting around an outer circumference of said holder portion at one end thereof,
 (ii) an adjusting portion at said one end immediately behind said first stopper flange, wherein a circumference of said adjusting portion being flared so as to be larger adjacent said first stopper flange,
 (iii) a first tapered section extending from an adjacent end of said adjusting portion toward the other end of said holder,
 (iv) an engaging portion at which said first tapered section terminates and having a circumference larger than an adjacent end of said first tapered section, (v) a second tapered section formed spaced from said engaging portion in the direction of said other end, (vi) a second stopper flange at which said second tapered section terminates and formed in the outer circumference of said holder, (vii) a cable securing portion extending from said second stopper flange to said other end, (viii) a first receiving opening at said one end being of a first diameter for receiving a first member, and (ix) a second receiving opening at said other end, said second receiving opening being of smaller diameter than said first receiving opening for receiving a second member of smaller diameter than said first member; and a slider, substantially ring shaped and disposed concentrically around said holder portion between said first and second stopper flanges, wherein said slider includes:

(i) an inner circumference smaller than the flared circumference of said adjusting portion (ii) tapered locking portions disposed on said inner circumference, (iii) at least a pair of arm portions operatively associated with said tapered locking portions to widen the distance between said locking portions and extending from said slider at opposite sides thereof and curving toward said one end of said holder; and (iv) wherein at a first position of said slider, said tapered locking portions being engagable with said second tapered portion adjacent said second stopper flange and, at a second position of said slider said tapered locking portions being engagable with said engaging portion of said holder.

2. An arrangement as set forth in claim 1, wherein an elastic portion is formed on a part of said adjusting portion such that said holder has increased flexibility at said elastic portion.

3. An arrangement as set forth in claim 1, wherein said second receiving opening has one end of a control cable received therein, and the other end of said control cable is anchored in a stopper of an automobile ignition cylinder.

4. An arrangement as set forth in claim 3, wherein said first receiving opening has a threaded end of a rod received therein and the other end of said rod is operatively associated with a gear shift lever.

5. An arrangement as set forth in claim 4, wherein a flange portion is formed on the outer circumference of the slider so as to be adjacent the rod in said second position of said slider.

6. An arrangement as set forth in claim 4, wherein an inner diameter of the slider is d1, an inner diameter of the receiving opening at said one end is d2, a largest diameter of the flared adjusting portion is D1, and a diameter of said threaded end of said rod is D2, said diameters having a relationship such that $D1 > d1 > d2 > D2$.

7. An arrangement as set forth in claim 1, wherein said holder portion and said slider are formed of synthetic resin.

8. An arrangement as set forth in claim 1, wherein said holder portion and said slider are formed of rubber.

* * * * *